(12) United States Patent
Jones, Jr. et al.

(10) Patent No.: US 6,179,331 B1
(45) Date of Patent: Jan. 30, 2001

(54) CHILDREN'S RIDE-ON VEHICLE HAVING A VIBRATING ENGINE MODEL

(75) Inventors: John L. Jones, Jr., Aurora; William R. Howell, Chaffee, both of NY (US)

(73) Assignee: Mattel, Inc., El Segundo, CA (US)

( * ) Notice: Under 35 U.S.C. 154(b), the term of this patent shall be extended for 0 days.

(21) Appl. No.: 09/245,585

(22) Filed: Feb. 5, 1999

(51) Int. Cl.[7] .................................................. B62M 1/00
(52) U.S. Cl. ......................... 280/827; 446/404; 446/409
(58) Field of Search .................................. 280/827, 828; 446/404, 409, 431, 465, 3, 7; D21/128, 443, 495, 548

(56) References Cited

U.S. PATENT DOCUMENTS

| Re. 35,082 | 11/1995 | Kuo . |
| Re. 35,375 | 11/1996 | Park . |
| 2,181,282 | 11/1939 | Oster . |
| 2,234,770 | 3/1941 | Meyer . |
| 2,428,285 | 9/1947 | Lea . |
| 2,500,508 | 3/1950 | Bachin . |
| 3,530,617 | 9/1970 | Halvorson et al. . |
| 3,671,785 | 6/1972 | Fuchs et al. . |
| 3,840,760 | 10/1974 | de Boer . |
| 3,875,696 | * 4/1975 | Howland ............................... 446/404 |
| 3,939,605 | * 2/1976 | Allen ..................................... 446/404 |
| 4,465,949 | 8/1984 | Knauff . |
| 4,536,167 | 8/1985 | Hughes . |
| 4,925,427 | 5/1990 | Wu . |
| 5,074,820 | 12/1991 | Nakayama . |
| 5,152,708 | 10/1992 | Claugus et al. . |
| 5,314,372 | 5/1994 | Kramer . |
| 5,366,402 | 11/1994 | Rudell et al. . |
| 5,505,493 | * 4/1996 | Camfield et al. ..................... 280/828 |
| 5,533,899 | * 7/1996 | Young .................................... 434/61 |
| 5,679,047 | 10/1997 | Engel . |
| 5,997,016 | * 12/1999 | Kaechele ......................... 280/87.021 |
| 6,033,285 | * 3/2000 | Fine et al. ............................. 446/465 |

* cited by examiner

*Primary Examiner*—Kevin Hurley
(74) *Attorney, Agent, or Firm*—Kolisch, Hartwell, Dickinson, McCormack & Heuser

(57) ABSTRACT

An engine model for use on a children's ride-on vehicle. The engine model includes a pivotal portion configured to pivot about a pivot axis, a vibration source connected to the pivotal portion to thereby vibrate the pivotal portion at an amplitude, and an adjustment mechanism for selectively controlling the amplitude. A dampening structure may be provided to dampen the vibration of the pivotal portion.

23 Claims, 3 Drawing Sheets

CHILDREN'S RIDE-ON VEHICLE HAVING A VIBRATING ENGINE MODEL

FIELD OF THE INVENTION

The present invention is directed to children's ride-on vehicles, and more particularly, to an engine model attached to such a vehicle that simulates the vibration of an actual engine.

BACKGROUND

Children's ride-on vehicles are popular with many children. The popularity of such vehicles is in part due to children's desire to imitate the adult activity of driving. A children's ride-on vehicle closely resembling an actual vehicle allows a child to imagine himself or herself as driving an actual vehicle. An effort has therefore been made to manufacture ride-on vehicles that accurately portray features found on actual vehicles.

One feature found on "hot rod" and drag-racing type vehicles is an oversized engine that extends upwardly through the front hood of the vehicle. A vehicle equipped with such an oversized engine is assumed to be faster and more powerful than other vehicles because the engine cannot be contained beneath the front hood. When running, such exposed and oversized engines are loud and typically create more vibration than the vehicle is designed to absorb. The resulting noise and vibration combine to form a "rumble" that is distinctive of "hot rod" and drag racing vehicles. An oversized engine that creates noise and vibration has heretofore not been disposed on a children's ride-on vehicle.

SUMMARY OF THE INVENTION

The invention provides an engine model for use on a children's ride-on vehicle. The engine model includes a pivotal portion configured to pivot about a pivot axis and a vibration source connected to the pivotal portion to thereby vibrate the pivotal portion at a desired amplitude. An adjustment mechanism may be included to selectively control the amplitude.

DETAILED DESCRIPTION

Figure 1:
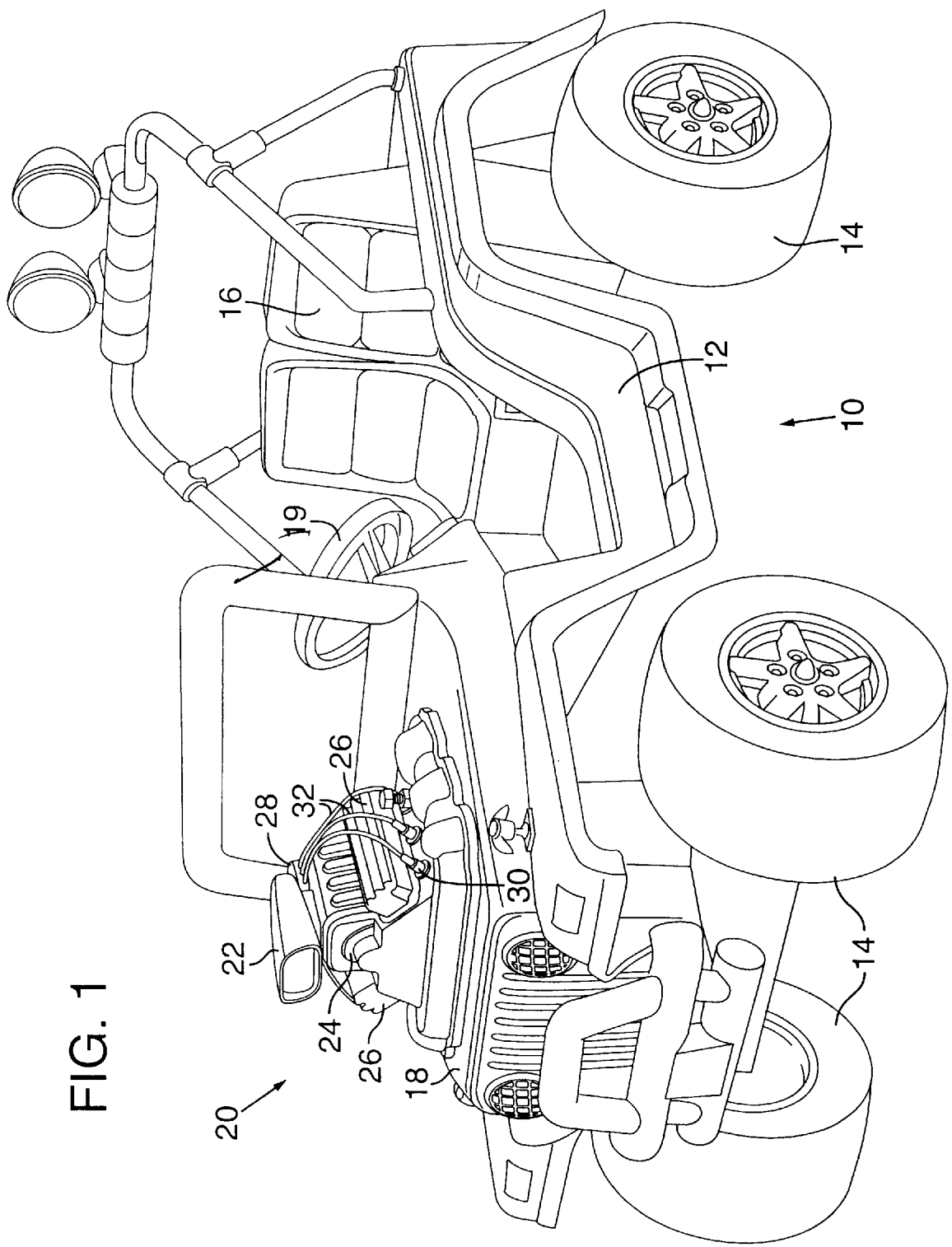
FIG. 1 is a perspective view of a children's ride-on vehicle with a model engine constructed according to the present invention.
Figure 2:
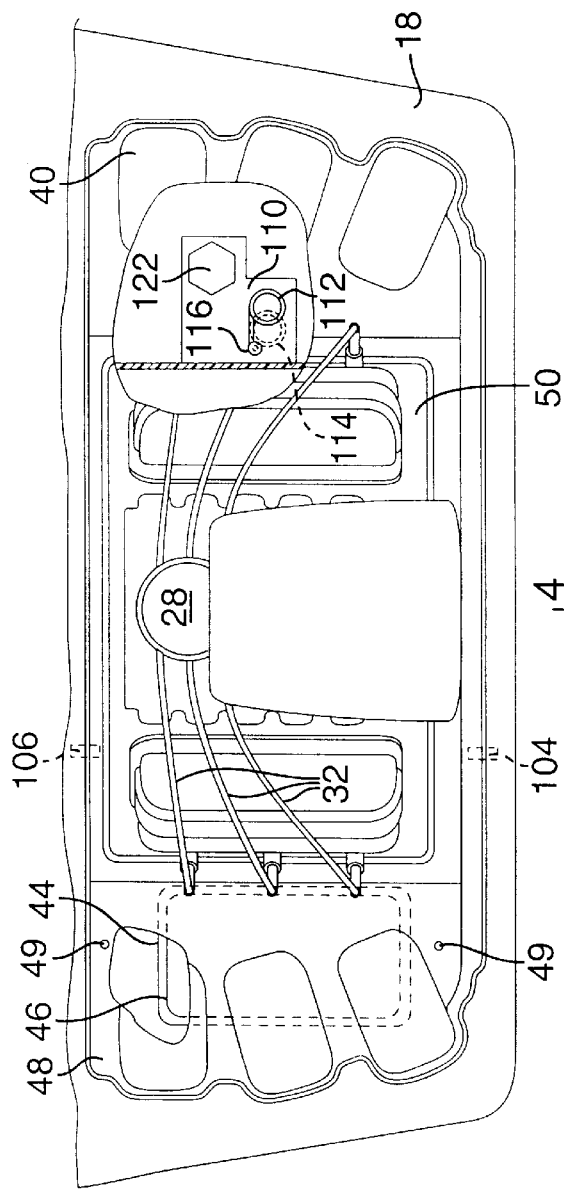
FIG. 2 is a top plan view of the model engine shown in FIG. 1.

FIG. 1 shows a children's ride-on vehicle 10. Vehicle 10 has a vehicle body 12, a plurality of wheels 14 rotatably attached to the vehicle body, and a seat 16 disposed on the vehicle body. A front hood 18 is disposed at a forward position of vehicle body 12. A child driver controls the movement of vehicle 10 using a steering wheel 19 and an actuation pedal (not shown) that controls an electrically powered motor (not shown). Typically the motor is powered by at least one battery. Vehicle 10 is shown as an illustrative example of a children's ride-on vehicle with which the subsequently described engine model may be used. It should be understood that the size, shape, and configuration of vehicle 10 may vary from that shown in FIG. 1.

Figure 4:
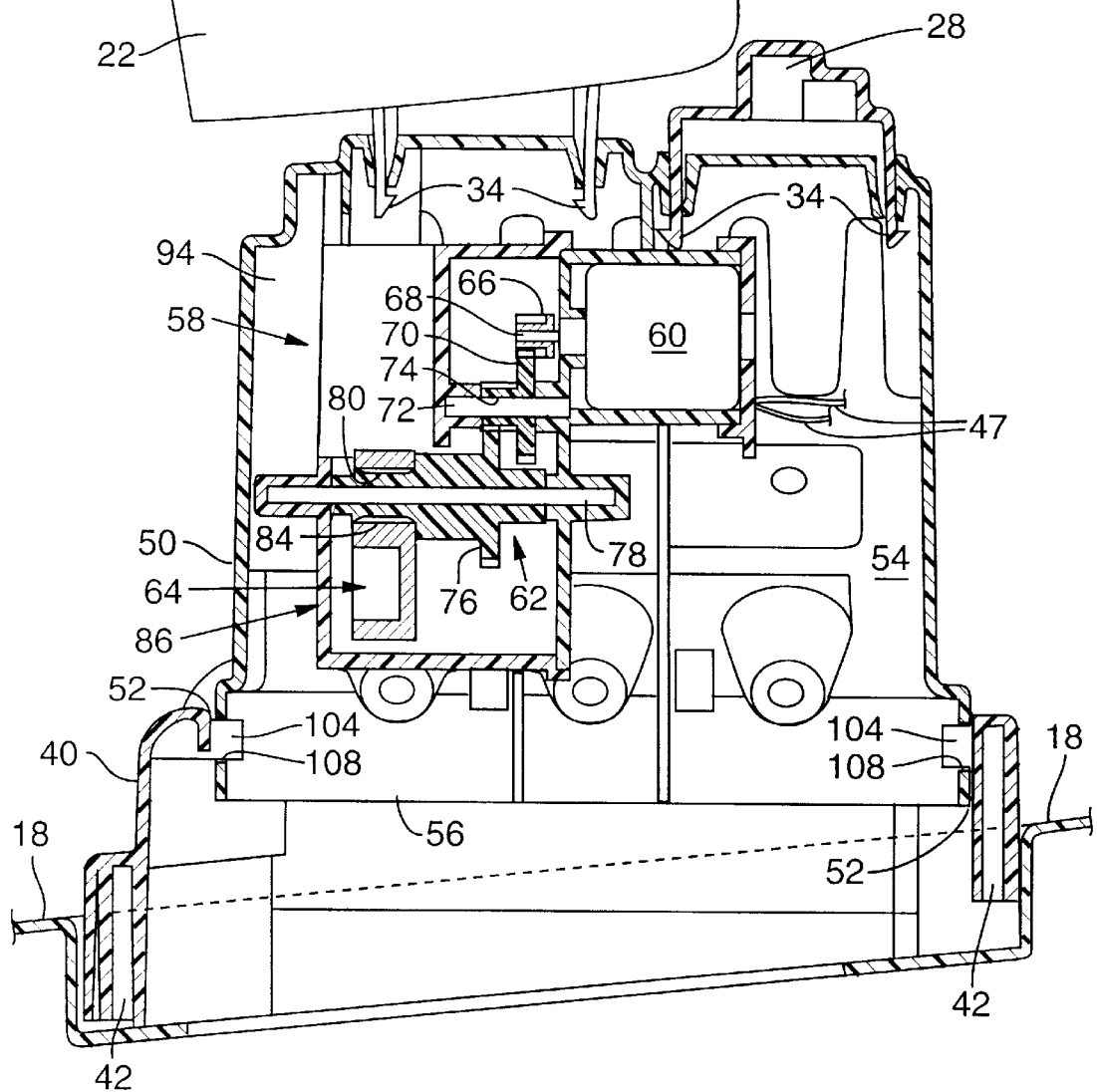
FIG. 4 is a sectional view of the model engine taken along the line 4—4 in FIG. 3.
Figure 5:
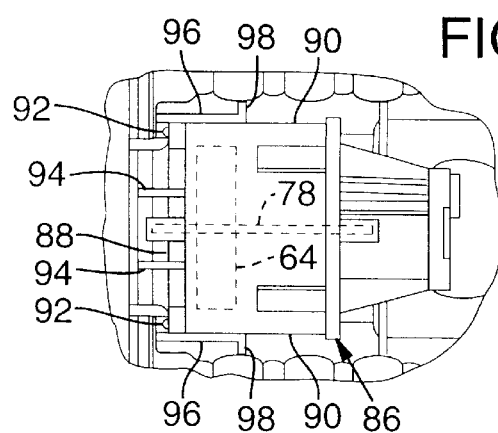
FIG. 5 is a detail of a bottom plan view of the engine model showing a vibration source attached to a portion of the engine model.
Figure 6:
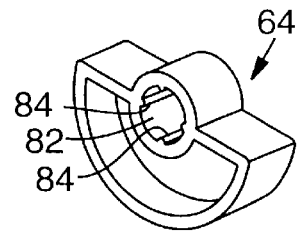
FIG. 6 is a perspective view of an eccentric weight usable with the present invention.

An engine model, shown generally at 20, is mounted on vehicle body 12, preferably so the engine model appears to extend upwardly through front hood 18. Engine model 20 may alternatively be located at the rear of vehicle or at any other suitable position. Engine model is constructed to resemble a functioning engine and may include simulated engine components resembling an air intake 22, an engine block 24, valve covers 26, distributor cap 28, spark plugs 30 and spark plug wires 32, or other components. The simulated components may be made of molded plastic or other suitable materials and may be manufactured integrally or separately with respect to each other. If manufactured separately, the components may be attached to each other as shown in FIG. 4, in which air intake 22 and distributor cap 28 are shown to have hooked extensions 34 that are non-removably inserted into engine model 20. The components may also be attached by screws, rivets, bolts, adhesive, or other permanent and removable methods.

Engine model 20 includes a first, non-pivotal portion 40 that is attached to front hood 18 or another part of vehicle body 12. A plurality of screw holes 42 permit screws (not shown) to attach non-pivotal portion 40 to front hood 18 from the underside of the front hood so that the screws are hidden from view. Non-pivotal portion 40 also encloses a battery compartment 44 that houses a desired number of batteries 46. Electric wires 47 connect batteries 46 to an electric motor, as will be described below. A compartment cover 48 is attached by screws 49 to non-pivotal portion 40 and functions to protect and hide batteries 46 within battery compartment 44.

Engine model also includes a second, pivotal portion 50 configured to fit in an opening 52 formed in non-pivotal portion 40. Pivotal portion preferably defines an enclosure 54 that is open at its bottom 56. Attached to pivotal portion 50 is a vibration source 58, which causes the pivotal portion to vibrate with respect to non-pivotal portion 40 and vehicle body 12. Vibration source 58 includes a source of motive power such as electric motor 60, a speed-reducing gearset 62, and an off-center or eccentric weight 64. Electric motor 60 is powered by batteries 46 and connected thereto by wires 47. A switch (not shown) is interposed between electric motor 60 and batteries 46 so that a user can turn the electric motor on and off. Speed-reducing gearset 62 includes a motor output gear 66 attached to a motor output shaft 68. Motor output gear 66 meshes with a large-diameter intermediate gear 70 that is mounted on an idler shaft 72. Large-diameter intermediate gear 70 is configured to rotate with a small-diameter intermediate gear 74 that is also mounted on idler shaft 72. Large-diameter intermediate gear 70 and small-diameter intermediate gear 74 may be integrally formed by known manufacturing methods. Small-diameter intermediate gear 74 meshes with a final gear 76 that is mounted on an output shaft 78. The tooth ratio between motor output gear 66 and large-diameter intermediate gear 70 and the tooth ratio between small-diameter intermediate gear 74 and final gear 76 are less than 1, and the rotational speed of final gear 76 is therefore substantially reduced from the rotational speed of motor output gear 66. The depicted embodiment achieves a speed reduction of approximately 9:1, but speed-reducing gearset 62 may be modified to achieve any desired speed reduction. For instance, a greater or lesser number of gears may be used. Different size gears may be used. The gear tooth ratios may be varied. The pinion gear design shown in FIG. 4 may also be replaced by planetary, eccentric or friction gearing systems. Speed-reducing gearset 62 may be eliminated if the output rotational speed of electric motor 60 provides a satisfactory vibration frequency.

A plurality of splines 80 are formed preferably integrally with final gear 76. Eccentric weight 64 has a bore 82 with a plurality of ridges 84 formed therein. Ridges 84 contact splines 80 and rotate eccentric weight 62 when output gear 76 is rotated.

Vibration source 58 is mounted in a housing 86 that has a front 88 and sides 90. Screws 92 attach front 88 to pivotal portion 50. A first set of fins 94 contact front 88 and a second set of fins 96 contact sides 90. First and second sets of fins 94, 96 assist in the placement of housing 86 within pivotal portion 50 and further function to transfer vibrations from vibration source 58 to pivotal portion 50. Each fin in the second set of fins 96 is shown as having a flanged section 98, but the flanged section may be eliminated if desired.

Pivotal portion 50 has first and second ends 100, 102. Pivotal portion 50 is connected to non-pivotal portion 40 by first and second pivot pins 104, 106 that are attached to and extend from non-pivotal portion 40 and rest in holes 108 formed in the pivotal portion. Pivot pins 104, 106 may alternately be attached to and extend from pivotal portion 50 and rest in holes formed in non-pivotal portion 40. First and second pivot pins 104, 106 are disposed adjacent first end 100 of pivotal portion 50, but may be located at any position along the pivotal portion provided the pivotal portion is free to pivot with respect to non-pivotal portion 40.

Figure 3:
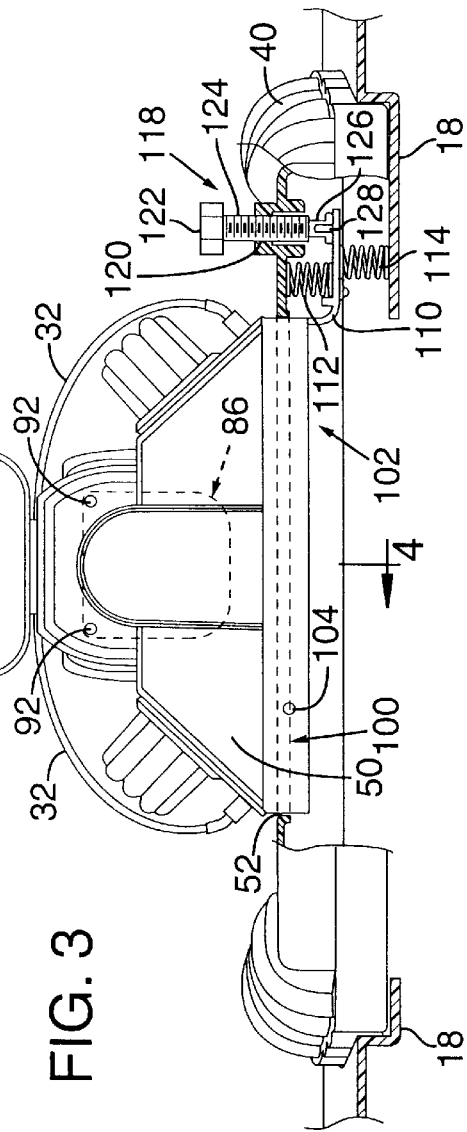
FIG. 3 is a front elevation view of the model engine of FIG. 1.

Second end 102 has an extension 110 disposed to extend between non-pivotal portion 40 and front hood 18, as shown in FIG. 3. A first spring 112 is disposed between extension 110 and non-pivotal portion 40, and a second spring 114 is disposed between extension 110 and front hood 18. In the depicted embodiment, a rivet 116 secures first and second springs 112, 114 to extension 110, although other attachment means may also be used. The interaction between first and second springs 112, 114 and extension 110 functions to dampen the vibration of pivotal portion 50 and biases the pivotal portion to a substantially horizontal position, even when the pivotal portion is subject to vibration. First and second springs 112, 114 further function to insulate vehicle body 12 from the vibrating pivotal portion 50.

An adjusting bolt or screw 118 is threaded through a threaded bore 120 that is disposed in non-pivotal portion 40 above extension 110. Adjusting bolt 118 has a head 122, a threaded section 124, and a flanged end 126 that has a cross-sectional area greater than the diameter of threaded bore 120. Flanged end 126 has a recess 128 that reduces the cross-sectional area of the flanged end so that the flanged end can fit through threaded bore 120. Once through threaded bore 120, flanged end 126 returns to its original shape. The increased cross-sectional area of flanged end 126 prevents removal of adjusting bolt 118 through threaded bore 120. Flanged end 126 contacts extension 110 and acts against force of first and second springs 112, 114 to adjust the amplitude of vibration of pivotal portion 50 with respect to non-pivotal portion 40.

In operation, a user connects batteries 46 and electric motor 60 using switch (not shown), and the electric motor is turned on. Electric motor 60 imparts rotational motion to motor output shaft 68, through speed-reducing gearset 62 as described above, and to eccentric weight 64. Eccentric weight 64 is thereby rotated and causes housing 86 to vibrate at a desired frequency. Since housing 64 is firmly connected to pivotal portion 50, pivotal portion 50 also begins to vibrate or pivot about pivot pins 104, 106. First and second springs 112, 114 bias pivotal portions against the vibrations and dampen the vibrations. By screwing or unscrewing adjusting bolt 118, a user can vary the amplitude of the vibration of pivotal portion 50. This is because flanged end 126 defines the upper limit of travel of extension 110 as pivotal portion 50 pivots on first and second pivot pins 104, 106. If adjusting bolt 118 is loosened so that flanged end 126 is moved in an upward direction as depicted in FIG. 3, extension 110 is not limited in its upward travel by the flanged end, and the amplitude of the vibrations is large. If adjusting bolt 118 is tightened so that flanged end 126 is lowered, extension 110 is limited in its upward travel. The downward travel is also limited in this circumstance because second spring 114 is compressed when adjusting bolt 118 is lowered. Second spring 114 will greatly urge extension 110 upward against flanged end and will resist the vibrations' tendency to move the extension downward. Adjusting bolt 118 may be tightened or loosened at any intermediate position to allow for any desired vibration amplitude.

Eccentric weight 64 rises and falls as it rotates about output shaft 78. Electric motor 60 therefore must lift the rotating eccentric weight 64, which places an increased load on the electric motor. Since the current drawn from batteries 46 is relatively constant, electric motor 60 can only compensate for the increased load by slightly reducing its rotational speed. As eccentric weight 64 falls, electric motor 60 increases its rotational speed because it does not have to lift the eccentric weight. The constant increasing and decreasing of rotational speed causes the sound created by electric motor 60 to vary during each rotation of eccentric weight 64. This sound, as well as the sound created by the contacting of the teeth of the various gears in speed-reducing gearset 62, is amplified by housing 86 and enclosure 54, each functioning as an acoustical amplification chamber. Further adding to the sound is any contact between pivotal portion 50 as it vibrates with respect to non-pivotal portion 60. The resulting combined sound simulates the sound of an actual engine, and when combined with the vibration of engine model 20, simulates the "rumble" of an actual engine.

One advantage of the engine model of the present invention is that it simulates the sound and vibration, or "rumbling," of an actual engine. A children's ride-on vehicle having such an engine model is more realistic and increases a child's interest in the vehicle. Another advantage is that the vibration amplitude may be easily varied according to the preferences of a user. Another advantage is that electric motor 58 does not draw power from the main battery (not shown) that drives vehicle 10. Although engine model 20 could be so modified, using batteries 46 to power electric motor 60 preserves the power and extends the life of the main battery. Another advantage is that vibration source 58 is small enough to fit inside pivotal portion 50. This increases the safety of engine model 20 because children are not able to access vibration source 58. Still another advantage is that engine model 20 may be easily manufactured using known manufacturing processes and techniques. Yet another advantage is that plastic pivotal portion 50 functions as an electrical insulator and protects children from electrical shock in the event electric motor 60 short-circuits. Yet another advantage is that first and second springs 112, 114 reduce vibration of vehicle body 12 when vibration source 58 is actuated. A child driver of vehicle 10 is therefore not subject to the vibrations created by vibration source 58.

As described above, the invented engine model provides a safe and inexpensive structure for simulating the vibration of an actual engine. Such an engine model is ideally suited for use on a children's ride-on vehicle. It will be appreciated that the different components of the invented system may be constructed of various materials as required by the application. Typically, the vehicle, the pivotal and non-pivotal portions of the engine model and the adjusting bolt are formed of a rigid plastic and/or metal. The gears are preferably made of plastic but may also be made of metal. The eccentric weight is made of a dense material such as metal.

While the invention has been disclosed in its preferred form, the specific embodiments thereof as disclosed and illustrated herein are not to be considered in a limiting sense as numerous variations are possible. Applicant regards the subject matter of his invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower or equal in scope to the original claims.

What is claimed is:

1. A children's ride-on vehicle, comprising:
   a vehicle having a body with a seat adapted to receive a child, a plurality of wheels, and a battery powered motor adapted to drive at least one of the wheels;
   an engine model mounted on the vehicle body and having a first portion mounted on the body, and a second portion pivotally mounted on the first portion for visibly vibratory movement; and
   a vibration source connected to the second portion to thereby vibrate the first portion with respect to the vehicle body.

2. The children's ride-on vehicle of claim 1, wherein the vibration source is an eccentrically mounted weight driven by a source of motive power.

3. The children's ride-on vehicle of claim 1, wherein the second portion of the engine model vibrates at an amplitude, and further comprising an adjustment mechanism that selectively varies the amplitude.

4. The children's ride-on vehicle of claim 3, wherein the adjustment mechanism is a bolt mounted to the first portion of the engine model, the bolt having a distal end configured to contact the second portion.

5. The children's ride-on vehicle of claim 3, wherein the adjustment mechanism includes a head adapted to be manipulated by a user to adjust the amplitude of vibration of the second portion and a threaded portion that extends through a bore in the second portion.

6. The children's ride-on vehicle of claim 5, wherein the bore is threaded and is adapted to threadingly receive the threaded portion of the adjustment mechanism.

7. The children's ride-on vehicle of claim 3, wherein the adjustment mechanism includes a head adapted to be manipulated by a user to adjust the amplitude of vibration of the second portion, a shaft that extends through a bore in the second portion toward the first portion, and an end distal the head.

8. The children's ride-on vehicle of claim 7, wherein the end of the adjustment mechanism has a greater cross-sectional area than the bore.

9. The children's ride-on vehicle of claim 8, wherein the end of the adjustment mechanism includes a recess adapted to permit the end of the adjustment mechanism to pass through the bore.

10. The children's ride-on vehicle of claim 1, wherein the second portion of the engine model vibrates at an amplitude, the vehicle further comprising an adjustment mechanism that selectively varies the amplitude.

11. The children's ride-on vehicle of claim 1, further including a biasing structure that reacts to the vibration of the second portion to assist the second portion to vibrate with respect to the vehicle body.

12. The children's ride-on vehicle of claim 11, wherein the biasing structure includes a first spring disposed to bias the second portion in at least a first direction.

13. The children's ride-on vehicle of claim 12, wherein the biasing structure further includes a second spring disposed to bias the second portion in a second direction.

14. An engine model for use on a vehicle, the engine model comprising:
   a pivotal portion configured to pivot about a pivot axis;
   a vibration source connected to the pivotal portion to thereby vibrate the pivotal portion at an amplitude; and
   an adjustment mechanism for selectively controlling the amplitude, wherein the adjustment mechanism is a bolt interposed between the pivotal portion and a non-pivotal portion for selectively limiting the amplitude of the vibration of the pivotal portion.

15. The engine model of claim 14, wherein the source of vibration is an eccentrically mounted weight driven by a source of motive power.

16. The engine model of claim 15, wherein the source of motive power is an electric motor.

17. The engine model of claim 15, further including a biasing structure that reacts to the vibration of the pivotal portion to cause the pivotal portion to reciprocally pivot with respect to the vehicle.

18. The engine model of claim 14, wherein the adjustment mechanism is located remotely from the pivot axis.

19. A children's ride-on vehicle, comprising:
   a vehicle body;
   an engine model mounted on the vehicle body and having a first portion mounted for visibly vibratory movement;
   a vibration source connected to the first portion to thereby vibrate the first portion with respect to the vehicle body; and
   a biasing structure that reacts to the vibration of the first portion to assist the first portion to vibrate with respect to the vehicle body, wherein the biasing structure includes a first spring disposed to bias the first portion in at least a first direction, and further wherein the biasing structure further includes a second spring disposed to bias the first portion in a second direction.

20. The children's ride-on vehicle of claim 19, wherein the body further includes a seat adapted to receive a child.

21. The children's ride-on vehicle of claim 19, further including a plurality of wheels and a battery powered motor adapted to drive at least one of the wheels.

22. The children's ride-on vehicle of claim 19, wherein the first portion of the engine model vibrates at amplitude, and the vehicle further includes an adjustment mechanism adapted to selectively adjust the amplitude of vibration of the first portion.

23. The children's ride-on vehicle of claim 19, wherein the vibration source includes an eccentrically mounted weight driven by a source of motive power.

* * * * *

UNITED STATES PATENT AND TRADEMARK OFFICE
CERTIFICATE OF CORRECTION

PATENT NO.         : 6,179,331 B1                                               Page 1 of 1
APPLICATION NO. : 09/245585
DATED              : January 30, 2001
INVENTOR(S)        : John L. Jones, Jr. and William R. Howell It is certified that error appears in the above-identified patent and that said Letters Patent is hereby corrected as shown below:

Column 5,
Line 40, after "thereby vibrate the," please delete "first" and insert -- second -- therefor.

Signed and Sealed this

Twenty-fifth Day of December, 2007

JON W. DUDAS
*Director of the United States Patent and Trademark Office*